(12) United States Patent
Lai

(10) Patent No.: US 10,836,420 B2
(45) Date of Patent: Nov. 17, 2020

(54) STEERING WHEEL SHEATH WITH COMPOSITE STRUCTURE

(71) Applicant: Po-Jen Lai, Taichung (TW)

(72) Inventor: Po-Jen Lai, Taichung (TW)

( * ) Notice: Subject to any disclaimer, the term of this patent is extended or adjusted under 35 U.S.C. 154(b) by 40 days.

(21) Appl. No.: 16/388,068

(22) Filed: Apr. 18, 2019

(65) Prior Publication Data
US 2020/0108854 A1 Apr. 9, 2020

(30) Foreign Application Priority Data

Oct. 3, 2018 (TW) .............................. 107213411 U
Mar. 11, 2019 (TW) .............................. 108202882 U

(51) Int. Cl.
*B62D 1/06* (2006.01)

(52) U.S. Cl.
CPC ...................................... *B62D 1/06* (2013.01)

(58) Field of Classification Search
CPC ....... B62D 1/06; B26D 1/04; Y10T 74/20834; Y10T 74/2087; B29L 2031/3047
See application file for complete search history.

(56) References Cited

U.S. PATENT DOCUMENTS

| 9,789,895 B2 * | 10/2017 | Yasui .................. B29C 45/1459 |
| 2009/0178509 A1 * | 7/2009 | Seidl ........................ B62D 1/06 74/558 |
| 2016/0090116 A1 * | 3/2016 | Joh ........................ B62D 1/06 74/558 |
| 2020/0156690 A1 * | 5/2020 | Nonoyama .............. B62D 1/06 |

FOREIGN PATENT DOCUMENTS

TW 434150 B 5/2001

* cited by examiner

*Primary Examiner* — Patrick Cicchino
(74) *Attorney, Agent, or Firm* — Birch, Stewart, Kolasch & Birch, LLP

(57) ABSTRACT

A steering wheel sheath includes a carbon fiber-comprising composite element and a leather element. The composite element forms a notch and a receiving space axially. Two ends of the composite element extend to form two connection portions bending by a predetermined angle. Inner walls of openings at two ends of the leather element form two engaging portions corresponding in position to the two connection portions of the composite element. An adhesive is applied to outer walls of the two connection portions of the composite element or inner walls of the two engaging portions of the leather element; hence, the composite element and the leather element are connected, coupled and fixed together. The customized manufacturing process allows the steering wheel sheath to be mounted by users and enhances overall feel.

18 Claims, 23 Drawing Sheets

STEERING WHEEL SHEATH WITH COMPOSITE STRUCTURE

BACKGROUND OF THE INVENTION

1. Technical Field

The present disclosure relates to steering wheel sheathes and, more particularly, to a steering wheel sheath with a composite structure.

Conventional vehicular accessories (for example, steering wheel sheathes, interior panels, and shift knobs) always have a market share in terms of production yield and demand. In this regard, regarding the manufacturing of steering wheels, Taiwan patent 434150B, entitled Method of Manufacturing Vehicular Part and Component, discloses: enclosing a carbon fiber-containing prepreg (20) with a porous thermo foam (10), then enclosing the carbon fiber-containing prepreg (20) with an exterior decoration material (30), such as any sort of decorative leather, for example carbon fabric or walnut bark, so as to form a blank (40); placing the blank (40) in molds (50, 51); closing the molds (50, 51); placing the molds (50, 51) on a hot-pressing platform to perform a pressing-heating process until temperature rises to around 130° C.~150° C. and stays at this temperature range for 15 minutes, thereby allowing the thermo foam (10), the prepreg (20) and the exterior decoration material (30) to be coupled together to form an integrally-formed element.

The method of manufacturing vehicular parts and components, as disclosed according to the prior art, essentially entails coupling together and curing the thermo foam (10), the prepreg (20) and the exterior decoration material (30) to form a unitary structure and advantageously attain high mechanical strength, low weight and high toughness. However, a vehicular component, for example, a steering wheel sheath, integrally formed by the aforesaid manufacturing method has a drawback: before the steering wheel sheath can be mounted on a steering wheel, the steering wheel sheath must undergo a processing process. As a result, not only is mounting the steering wheel sheath thus manufactured on the steering wheel time-consuming and complicated, but the steering wheel sheath thus manufactured also adds to the costs of a post-manufacturing processing process. Therefore, it is important to overcome the aforesaid drawback of the prior art.

BRIEF SUMMARY OF THE INVENTION

In view of the aforesaid drawbacks of the prior art, it is an objective of the present disclosure to provide a steering wheel sheath adapted to be mounted on a steering wheel. The customized manufacturing process of the steering wheel sheath has remarkable advantages, such as being mounted by users and enhancing overall feel.

In order to achieve the above and other objectives, the present disclosure provides a steering wheel sheath, comprising a carbon fiber-comprising composite element and an arcuate leather element.

The composite element comprises an arcuate pipe portion and two connection portions. The two connection portions extend to connect to two ends of the arcuate pipe portion, respectively. The two ends of the arcuate pipe portion bend by a predetermined angle toward an imaginary center. The arcuate pipe portion forms a notch and a receiving space axially. The notch is in communication with the receiving space.

The leather element forms a notch and a receiving space axially. The notch is in communication with the receiving space. Inner walls of openings at two ends of the leather element each sink to form an engaging portion. The two engaging portions correspond in position to the two connection portions of the composite element, respectively.

An adhesive is applied to outer walls of the two connection portions of the composite element or inner walls of the two engaging portions of the leather element such that the two engaging portions of the leather element are connected to the two connection portions of the composite element, respectively, and thus coupled and fixed together.

Preferably, the connection portions each have a shorter outer diameter than the arcuate pipe portion and thus form a shoulder surface such that the two engaging portions of the leather element connect to the two connection portions of the composite element and thus abut against the shoulder surfaces of the composite element, respectively.

Preferably, a basic point is defined at the middle of the junction of each of the two connection portions of the composite element and a corresponding one of the two engaging portions of the leather element, and an included angle is formed by and between two lines connecting the imaginary center to the basic points, respectively. The included angle ranges from 60° to 150°.

Preferably, further comprising two cover members, which disposed on both sides of the notch of the composite element, respectively. The notch of the composite element covered with the two cover members.

DETAILED DESCRIPTION OF THE INVENTION

Figure 1:
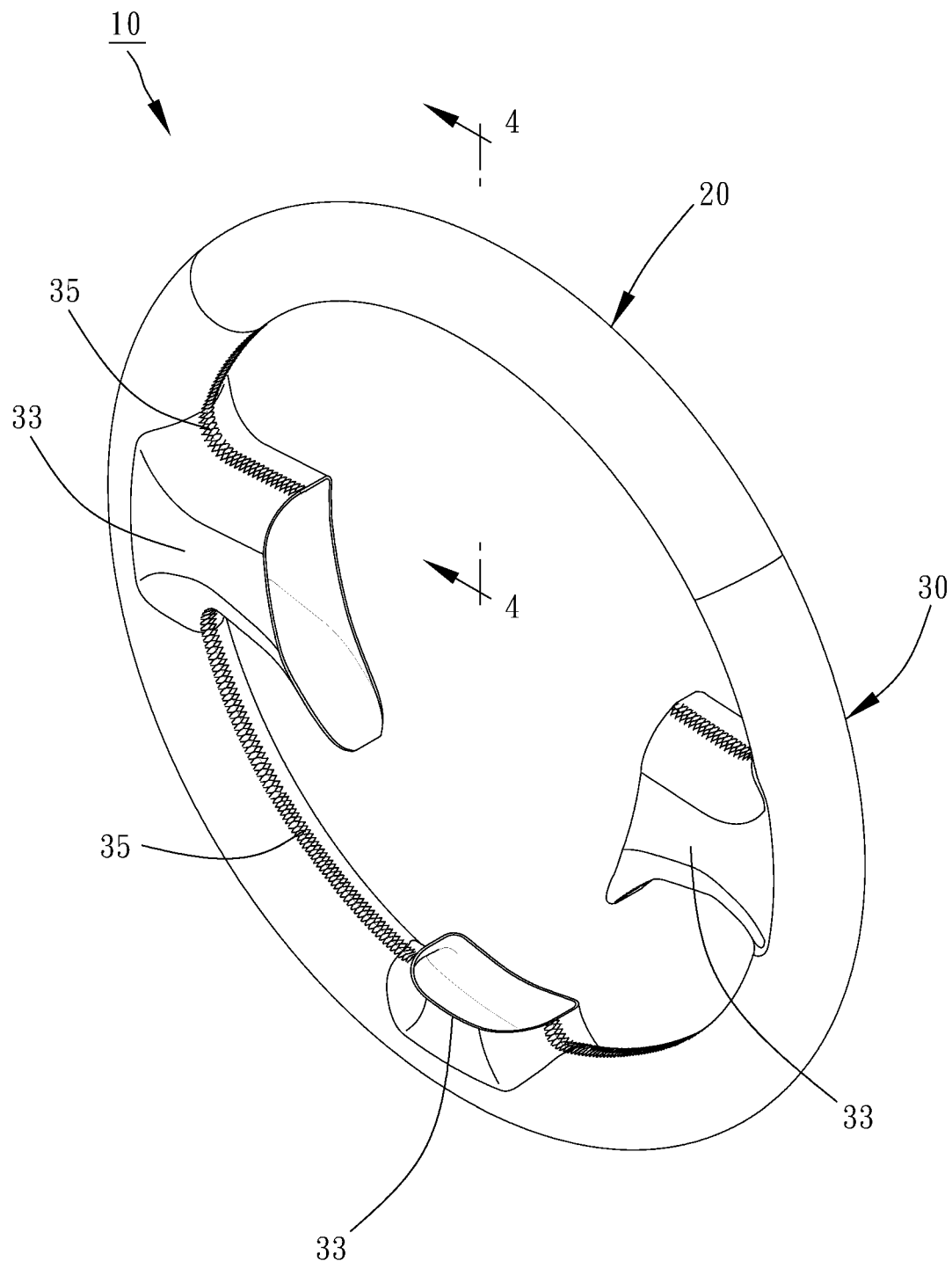
FIG. 1 is a perspective view of the first preferred embodiment of the present disclosure.

Structural features and anticipated advantages thereof of the present disclosure are hereunder illustrated by embodiments and accompanying drawings. In the embodiments and drawings, identical reference numerals denote identical or similar elements, components, objects, structures, systems, frameworks, devices, flowcharts, methods or steps.

Referring to FIG. 1 through FIG. 6, the first preferred embodiment of the present disclosure discloses a steering wheel sheath 10 adapted to be mounted on a three-spoke steering wheel 90. The steering wheel sheath 10 comprises a carbon fiber-comprising composite element 20 and a leather element 30 made of leather, artificial leather or synthetic leather thereof.

The composite element 20 comprises an arcuate pipe portion 21 and two connection portions 23. Two ends of the arcuate pipe portion 21 bend by a predetermined angle toward an imaginary center P1. The arcuate pipe portion 21 forms a notch 211 and a receiving space 213 axially. The notch 211 is in communication with the receiving space 213. The two connection portions 23 extend to connect to the two ends of the arcuate pipe portion 21, respectively. The connection portions 23 each have a shorter outer diameter than the arcuate pipe portion 21 and thus form a shoulder surface 25. Alternatively, the composite element 20 is formed by coupling together a dry fabric (including but not limited to a fabric made of glass fiber, basaltic fiber, Kevlar, polyethylene terephthalate fiber, polypropylene or made by weaving a combination thereof) and resin. The resin is thermosetting resin (for example, epoxy resin, phenol resin or a mixture thereof) or thermoplastic resin.

The leather element 30 is arcuate and forms a notch 301 and a receiving space 303 axially. The notch 301 is in communication with the receiving space 303; hence, inner walls of openings at two ends of the leather element 30 each sink to form an engaging portion 31. The two engaging portions 31 correspond in position to the two connection portions 23 of the composite element 20, respectively. Preferably, the two engaging portions 31 of the leather element 30 connect to the two connection portions 23 of the composite element 20, respectively, and then abut against the two shoulder surfaces 25 of the composite element 20, respectively. The leather element 30 further comprises three spoke portions 33. The spoke portions 33 each extend from or sink into the body of the leather element 30 to take on a pouch-shape. Two said spoke portions 33 are opposite and positioned proximate to the two engaging portions 31.

Anticipated advantages of the first preferred embodiment of the present disclosure are described below.

Figure 3:
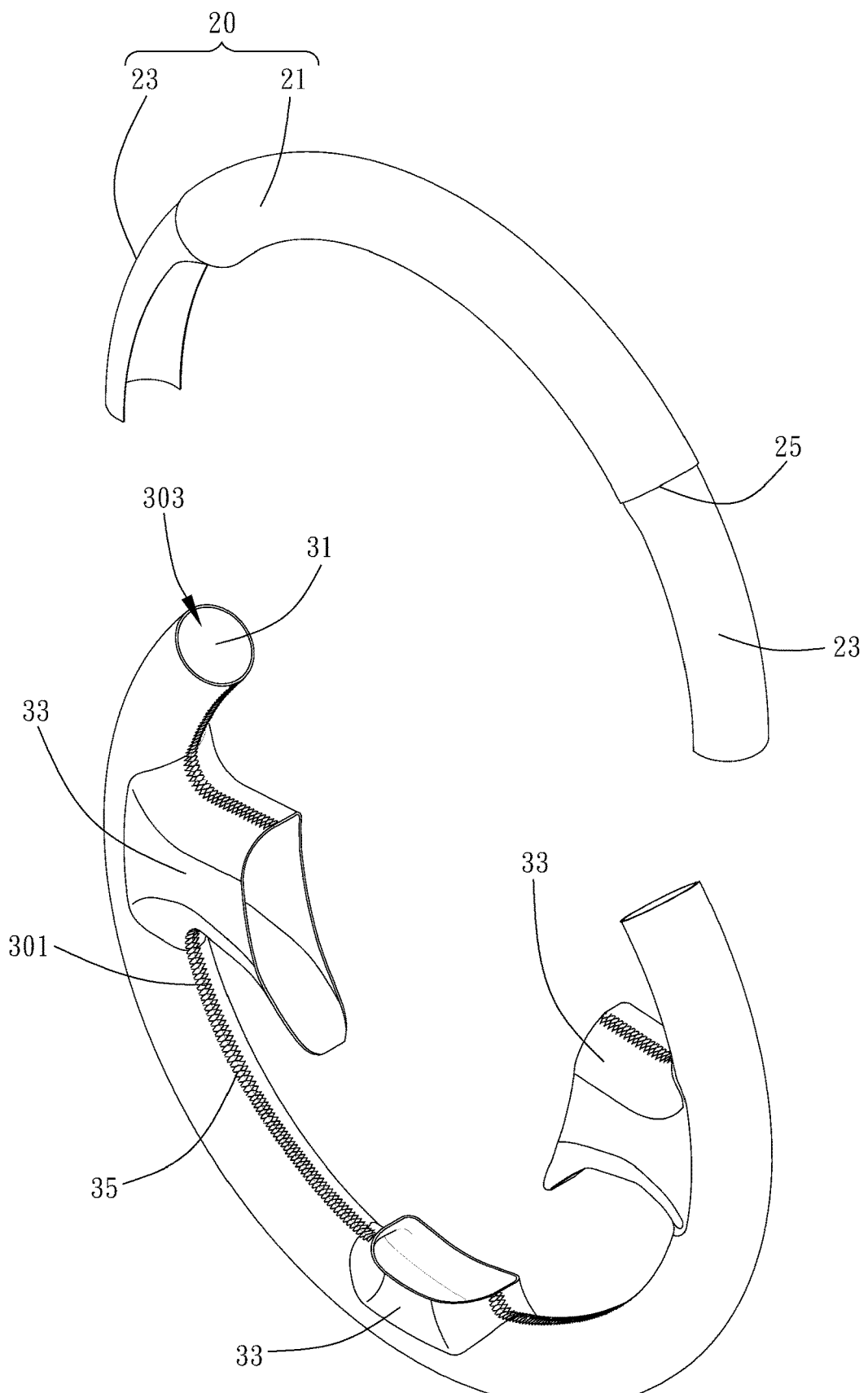
FIG. 3 is an exploded view of FIG. 1.
Figure 4:
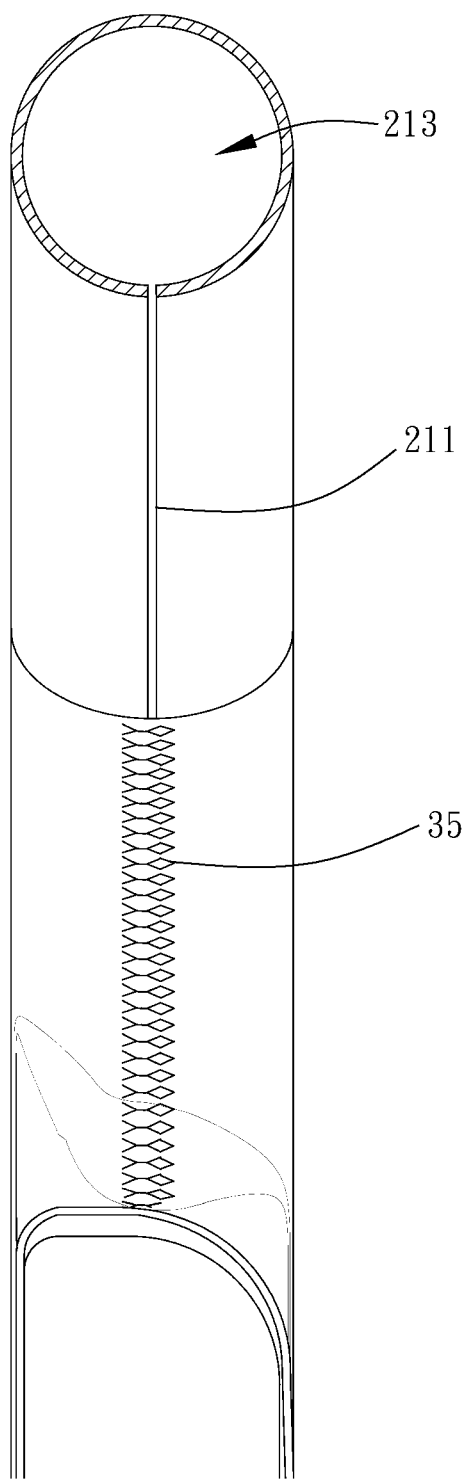
FIG. 4 is a partial cross-sectional view taken along line 4-4 of FIG. 1.
Figure 5:
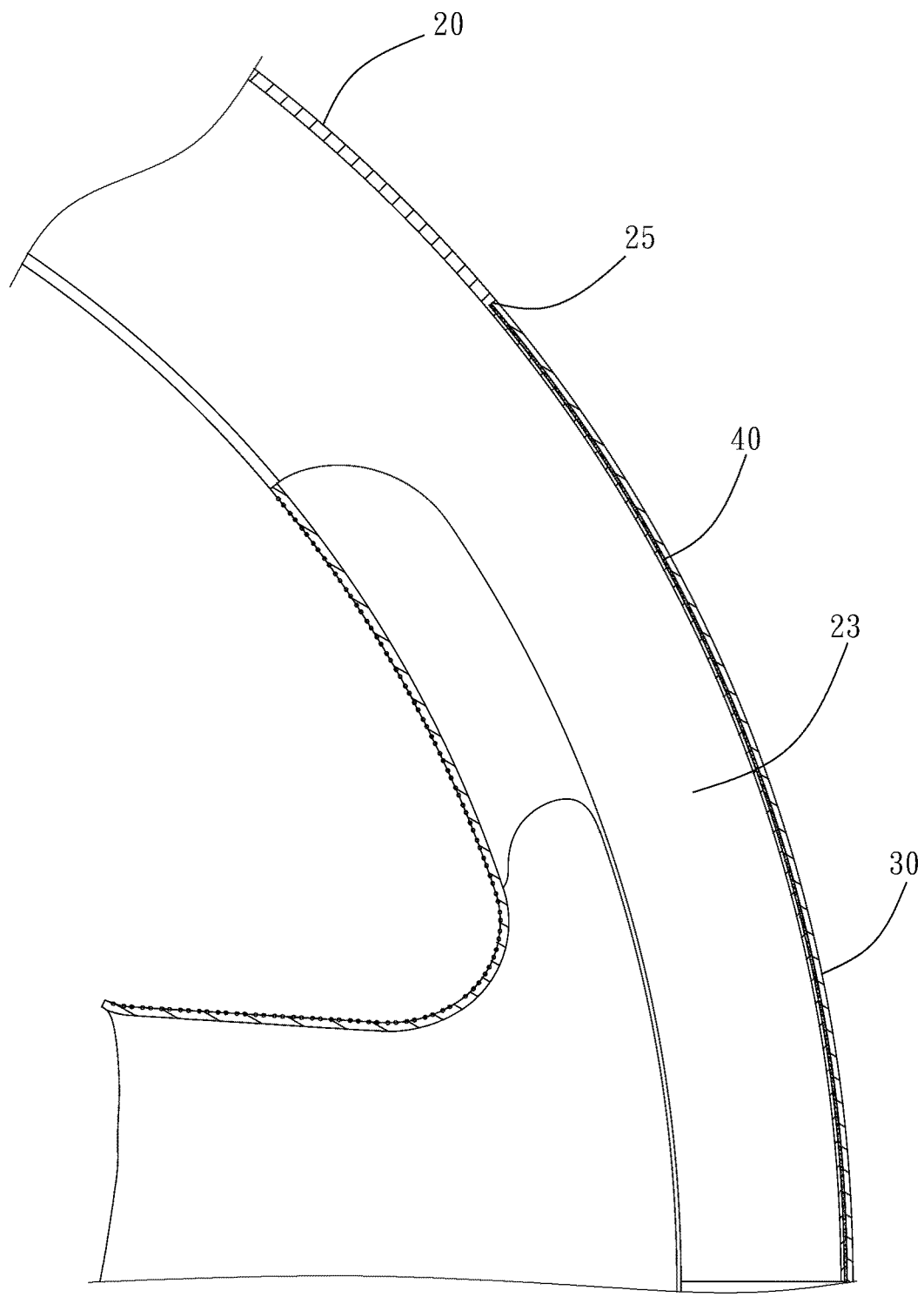
FIG. 5 is a partial cross-sectional view of FIG. 1.
Figure 7:
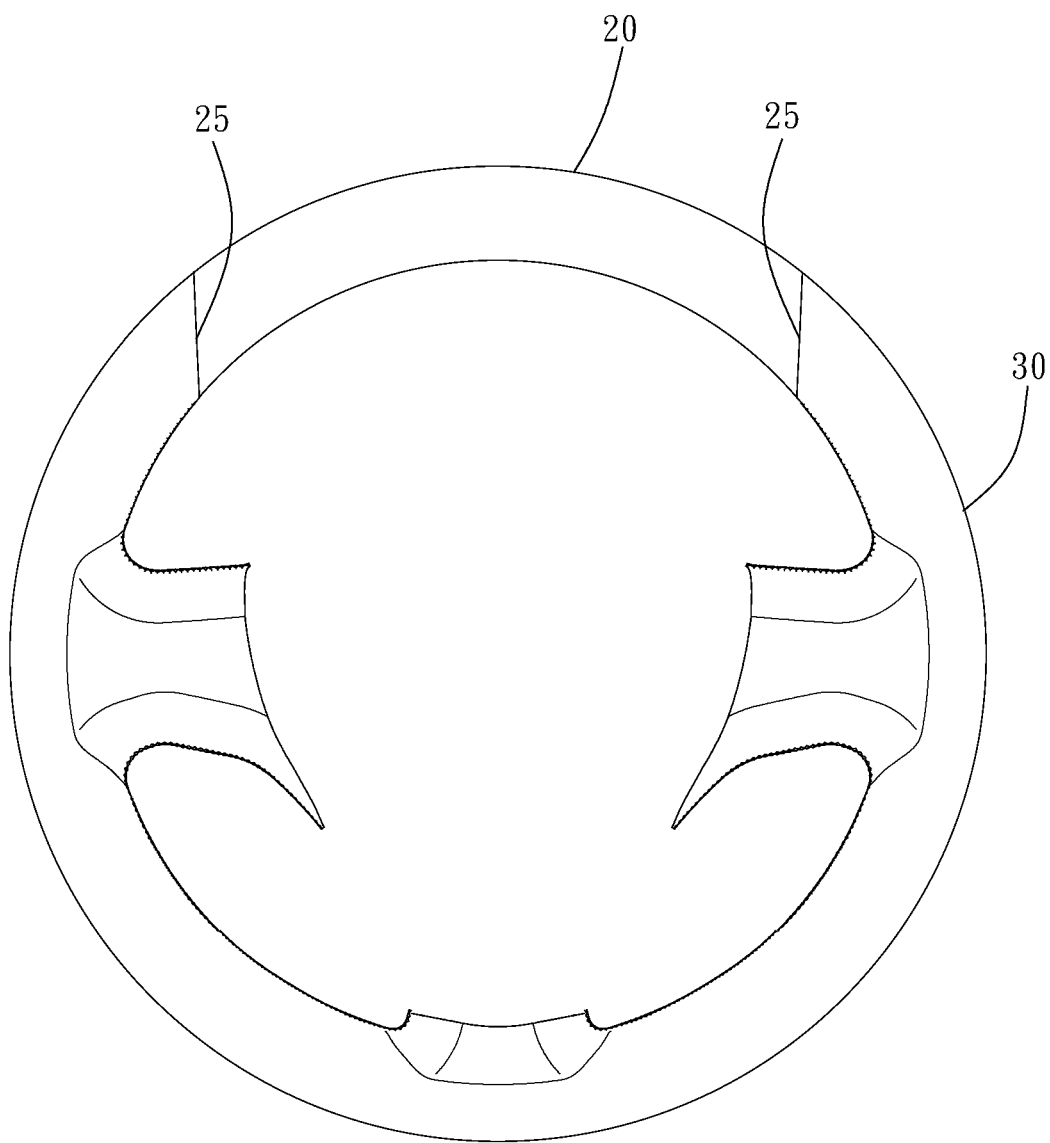
FIG. 7 is a front view of the second application of the first preferred embodiment of the present disclosure.
Figure 8:
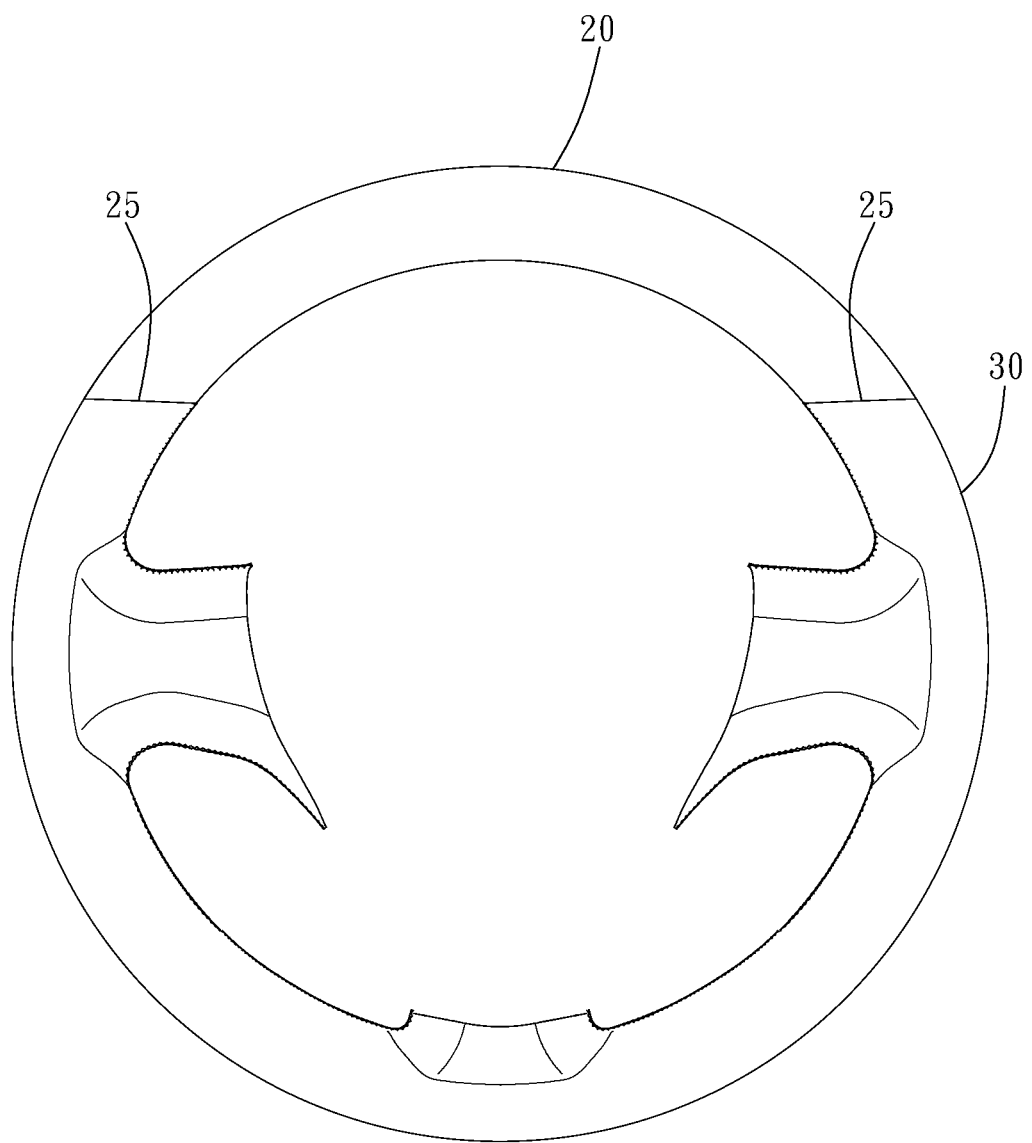
FIG. 8 is a front view of the third application of the first preferred embodiment of the present disclosure.
Figure 9:
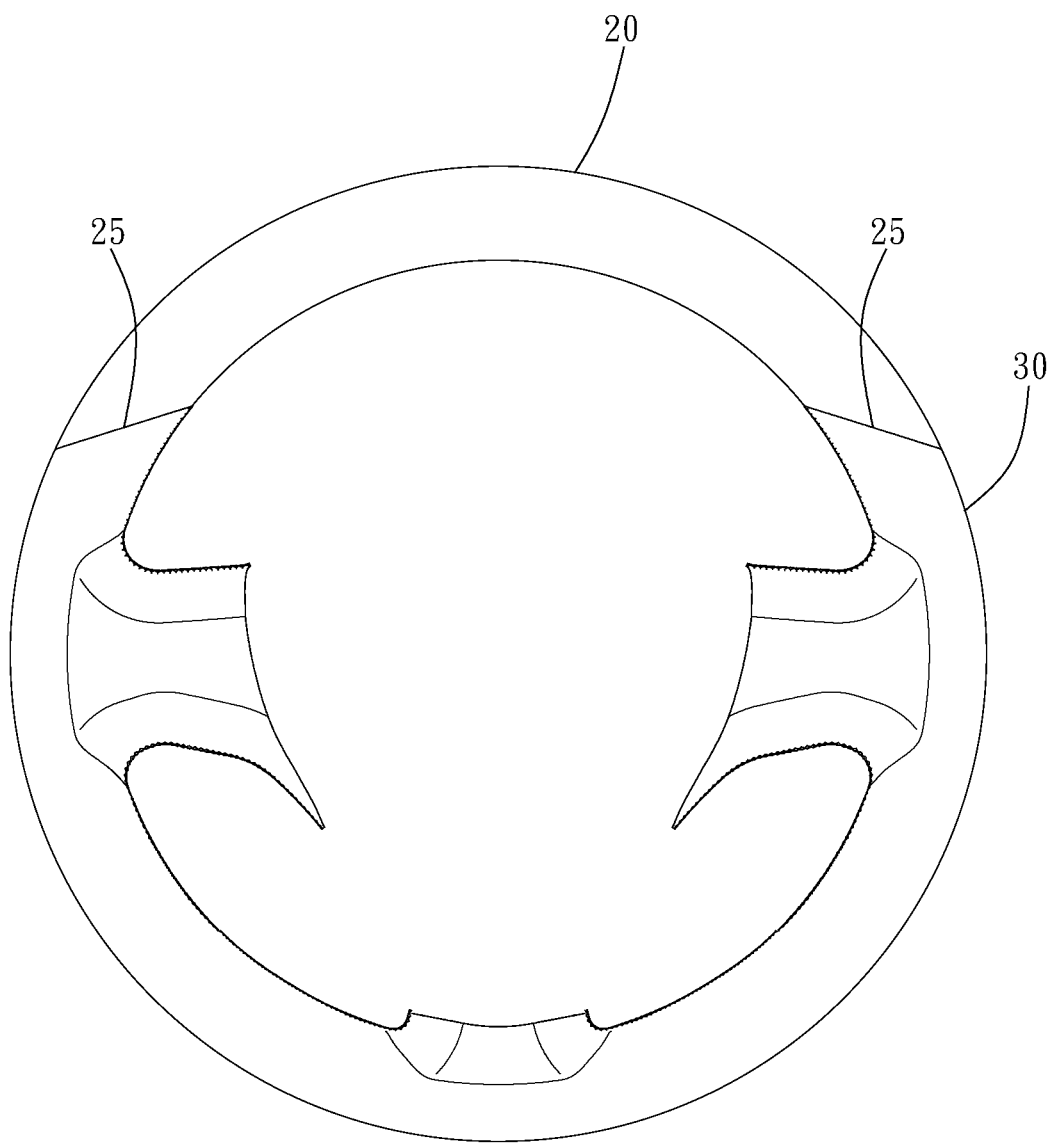
FIG. 9 is a front view of the fourth application of the first preferred embodiment of the present disclosure.

First, the steering wheel sheath 10 is manufactured by a customized manufacturing process. Referring to FIGS. 3~5, the customized manufacturing process of the steering wheel sheath 10 comprises the steps of: cleaning the arcuate pipe portions of the two connection portions 23 of the composite element 20 and the two engaging portions 31 of the inner walls of the leather element 30 with ethanol; applying uniformly an adhesive 40 (for example, epoxy adhesive) to outer walls of the two connection portions 23 of the composite element 20 or inner walls of the two engaging portions 31 of the leather element 30; and placing the composite element 20 and the leather element 30 in customized molds to undergo baking such that the two connection portions 23 of the composite element 20 are coupled to and thus fixed to the two engaging portions 31 of the leather element 30, respectively, with the adhesive 40 and under predetermined baking conditions. Referring to FIG. 7, the direction of the diagram is regarded as an imaginary direction, wherein the junctions of the two connection portions 23 of the composite element 20 and the two engaging portions 31 of the leather element 30 are vertical for the sake of customization, respectively. Referring to FIG. 8, the direction of the diagram is regarded as an imaginary direction, wherein the junctions of the two connection portions 23 of the composite element 20 and the two engaging portions 31 of the leather element 30 are horizontal for the sake of customization, respectively. Referring to FIG. 9, the direction of the diagram is regarded as an imaginary direction, wherein the junctions of the two connection portions 23 of the composite element 20 and the two engaging portions 31 of the leather element 30 are oblique for the sake of customization, respectively.

Figure 2:
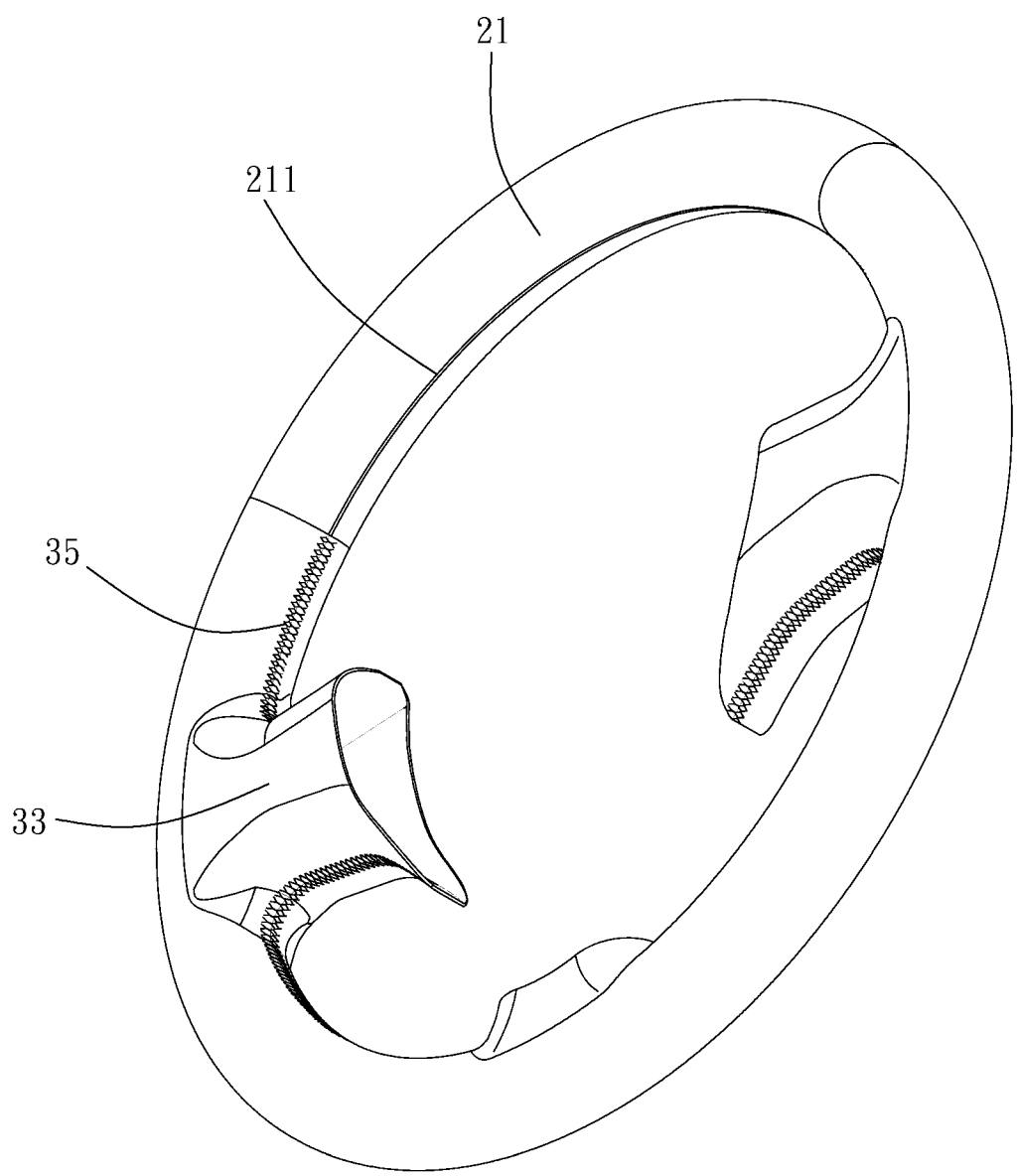
FIG. 2 is a perspective view of FIG. 1 from another angle.
Figure 6:
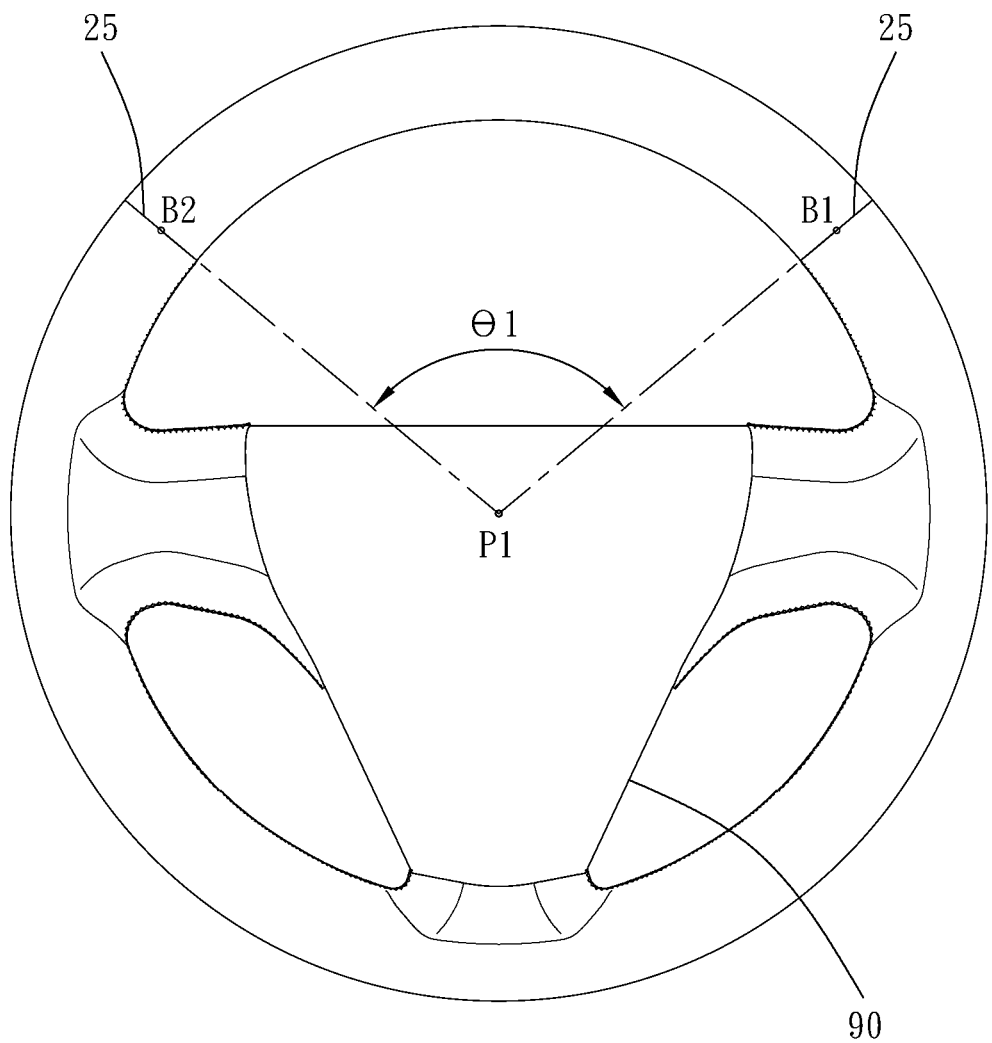
FIG. 6 is a front view of the first application of the first preferred embodiment of the present disclosure.

Second, the steering wheel sheath 10 are mounted by users. Referring to FIGS. 1, 2, 6, to mount the steering wheel sheath 10 on the steering wheel 90, a user aims the steering wheel sheath 10 at the steering wheel 90, allows the notch 211 of the composite element 20 of the steering wheel sheath 10 and the notch 301 of the leather element 30 to engage with the outer walls of the steering wheel 90, inserts preferably the spoke portions 33 of the leather element 30 into three spoke openings of the steering wheel 90, respectively, and sews the leather element 30 to the steering wheel 90 with a sewing thread 35.

Third, the steering wheel sheath 10 enhances overall feel. Referring to FIGS. 1, 6, since the composite element 20 of the steering wheel sheath 10 is made of carbon fiber, the composite element 20 mounted on the steering wheel 90 enhances the feel of all the accessories of the vehicle. Preferably, the composite element 20 of the steering wheel sheath 10 corresponds in position to the upper segment of the steering wheel 90 as soon as the user turns the steering wheel 90 clockwise. Preferably, basic points B1, B2 are defined at the middles of the junctions of the two connection portions 23 of the composite element 20 and the two engaging portions 31 of the leather element 30, respectively. An included angle $\theta 1$ is formed by and between two lines connecting an imaginary center P1 of the steering wheel sheath 10 to the basic points B1, B2, respectively. In this embodiment, the included angle $\theta 1$ ranges from 60° to 150°, preferably 67.5° to 142.5°, and most preferably 75° to 135°.

The present disclosure further provides a method of manufacturing a steering wheel sheath 10, comprising the steps of:

Step S1: providing materials, that is, providing a carbon fiber-comprising composite element 20 and a leather element 30 made of leather, artificial leather or synthetic leather thereof.

Step S2: performing predetermined cutting, that is, cutting the composite element 20 and the leather element 30 to predetermined forms to meet customization needs.

Step S3: placing the composite element in molds, that is, cutting the composite element in predetermined shape and enclosing a predetermined airbag with the composite element and then placing the airbag-enclosed composite element 20 in the molds.

Step S4: performing a hot-pressing process, that is, placing the molds in a hot-pressing apparatus to undergo pressing and heating. Related process parameters of the hot-pressing apparatus are set as follows: setting extra-mold pressure to 100 kg/cm$^2$, setting intra-mold pressure to 3 kg/cm$^2$, setting mold temperature to 150° C. and then keeping the temperature for 30 minutes, and setting thickness of the composite element 20 thus formed to around 0.2 mm~0.7 mm.

Step S5: demolding and forming, that is, removing the molds which have undergone the hot-pressing process, and separating the composite element 20 and the airbag. Preferably, the composite element 20 thus demolded forms an object comprising the arcuate pipe portion 21 and the two connection portions 23 connected to the two ends of the arcuate pipe portion 21, respectively. The arcuate pipe portion 21 forms a notch 211 and a receiving space 213 axially. The notch 211 is in communication with the receiving space 213. The connection portions 23 each have a shorter outer diameter than the arcuate pipe portion 21 and thus form a shoulder surface 25. Preferably, if the composite element 20 thus demolded is a closed arcuate round tube, it can undergo a cutting process, such as CNC, to form the notch 211 and the two connection portions 23 disposed at the two ends of the composite element 20. The notch 211 is in communication with the receiving space 213, allowing the composite element 20 to take on a desirable shape.

Step S6: performing surface treatment, that is, performing surface treatment on the composite element 20 thus demolded and formed. The surface treatment comprises sub-steps as follows: ultrasonic cleansing, baking-drying, mask spray, painting with primer, first baking, roughening, applying finish, second baking, and polishing. To perform ultrasonic cleansing and baking-drying, it is necessary to place the composite element 20 in the ultrasonic cleansing apparatus to undergo rinsing for 20 minutes and then undergo water-rinsing. Then, the composite element 20 is placed in an oven apparatus to undergo baking-drying at a baking-drying temperature of 85° C. for 15 minutes. To perform mask spray, painting with primer, and first baking, it is necessary that the two connection portions 23 of the composite element 20 which have undergone baking-drying are each covered with a mask spray jig, then placed on a spray coating jig to undergo primer spray coating, and finally placed in an oven apparatus to undergo first baking at a baking temperature of 80° C. for 60 minutes. To perform roughening, applying finish, and second baking, it is necessary that the arcuate pipe portion 21 of the composite element 20 undergoes roughening with a grinding wheel (for example, 400# grinding wheel), is then placed on the spray coating jig again to undergo spray coating finish (the finish is formed by mixing a base (for example, UT-921A(E)), curing agent, and solvent), and is finally placed in the oven apparatus to undergo second baking at a baking temperature of 80° C. for 60 minutes. Polishing entails grinding the arcuate pipe portion 21 of the composite element 20 with a sand wheel (for example, 1000# sand wheel) to render the surface of the arcuate pipe portion 21 of the composite element 20 smooth and flat.

Step S7: coupling, that is, cleaning outer walls of the two connection portions 23 of the composite element 20 or inner walls of the two engaging portions 31 of the leather element 30 with ethanol, applying uniformly the adhesive 40 (for example, epoxy adhesive) to outer walls of the two connection portions 23 of the composite element 20 or inner walls of the two engaging portions 31 of the leather element 30; and placing the composite element 20 and the leather element 30 in customized molds and then in the oven apparatus to undergo baking and coupling such that the two connection portions 23 of the composite element 20 are coupled to and thus fixed to the two engaging portions 31 of the leather element 30, respectively, with the adhesive 40 and under predetermined baking conditions, for example, at a first-session baking temperature of 50° C. for 30 minutes and a second-session baking temperature of 80° C. for 40 minutes. Preferably, finally, the steering wheel sheath 10 which has undergone the aforesaid coupling process is packaged and then delivered.

Figure 10:
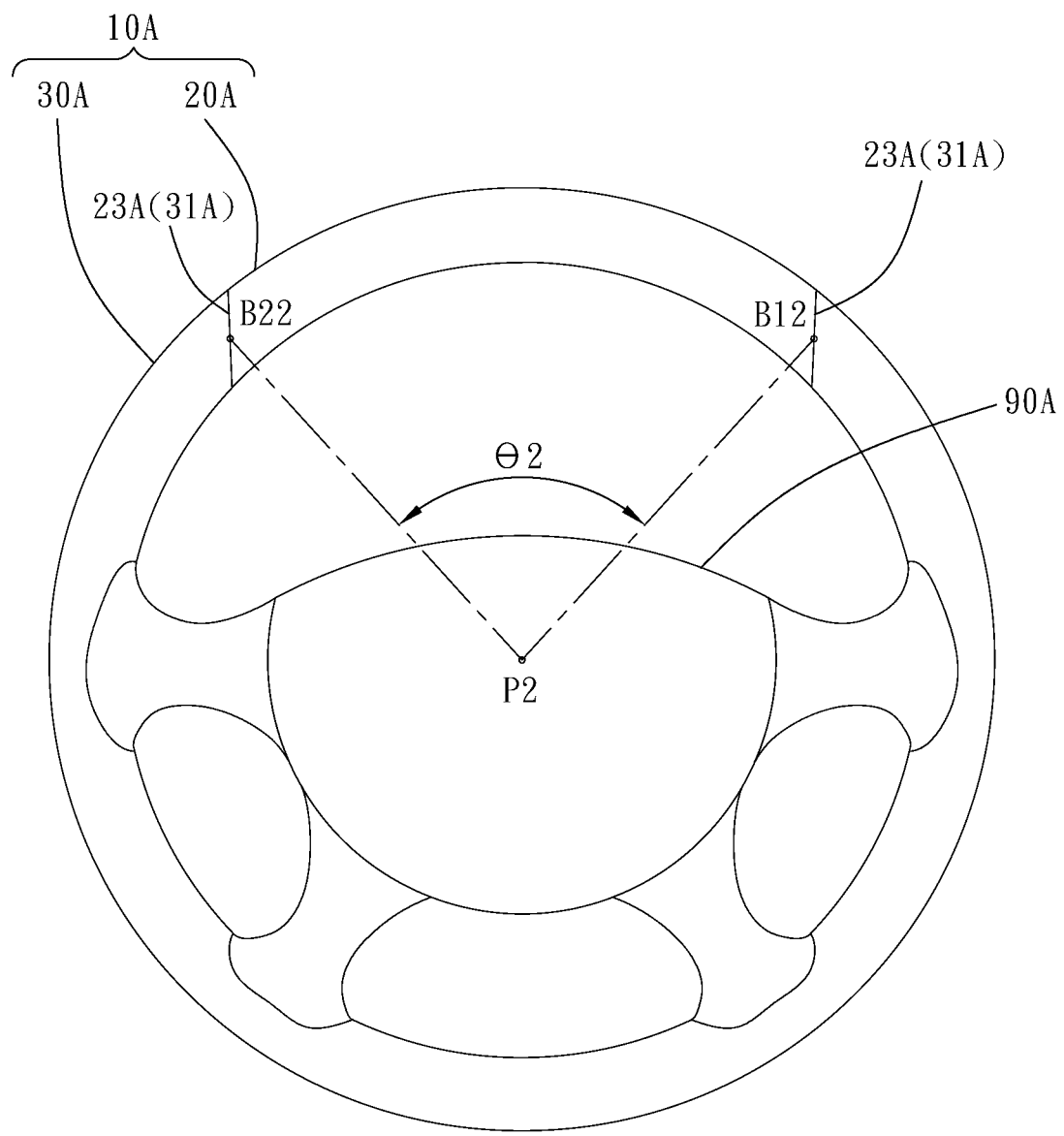
FIG. 10 is a front view of an application of the second preferred embodiment of the present disclosure.

Referring to FIG. 10, the second preferred embodiment of the present disclosure discloses another steering wheel sheath 10A adapted to be mounted on a four-spoke steering wheel 90A. The steering wheel sheath 10A in the second preferred embodiment is substantially identical to its counterpart in the first preferred embodiment and thus comprises a carbon fiber-comprising composite element 20A and a leather element 30A made of leather, artificial leather or synthetic leather thereof, except for the following.

The composite element 20A of the steering wheel sheath 10A corresponds in position to the upper segment of the steering wheel 90A as soon as the user turns the steering wheel 90A clockwise. Preferably, basic points B12, B22 are defined at the middles of the junctions of the two connection portions 23A of the composite element 20A and the two engaging portions 31A of the leather element 30A, respectively. An included angle θ2 is formed by and between two lines connecting an imaginary center P2 of the steering wheel sheath 10A to the basic points B12, B22, respectively. In this embodiment, the included angle θ2 ranges from 60° to 150° and preferably ranges from 67.5° to 142.5°.

Figure 11:
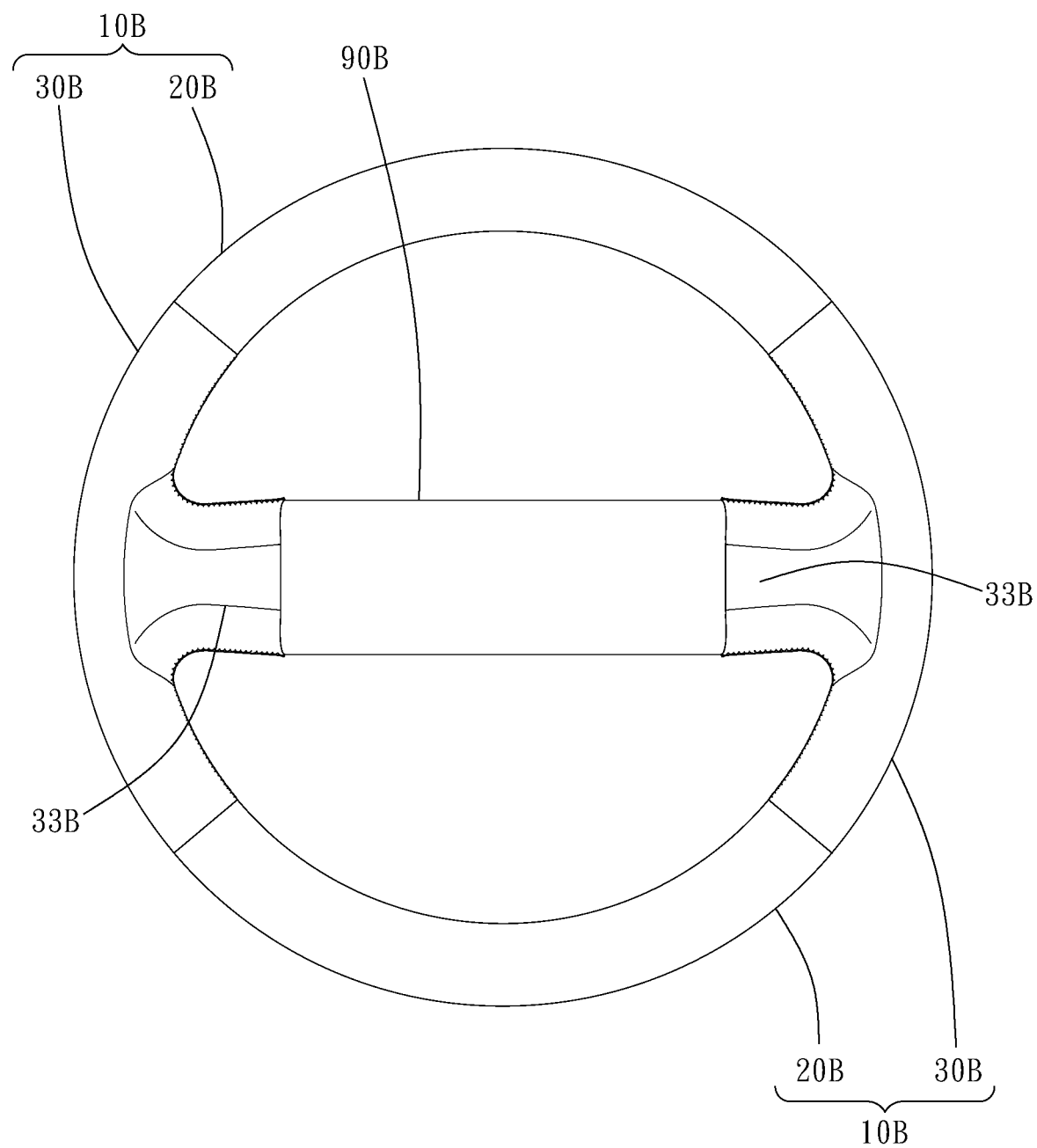
FIG. 11 is a front view of an application of the third preferred embodiment of the present disclosure.
Figure 12:
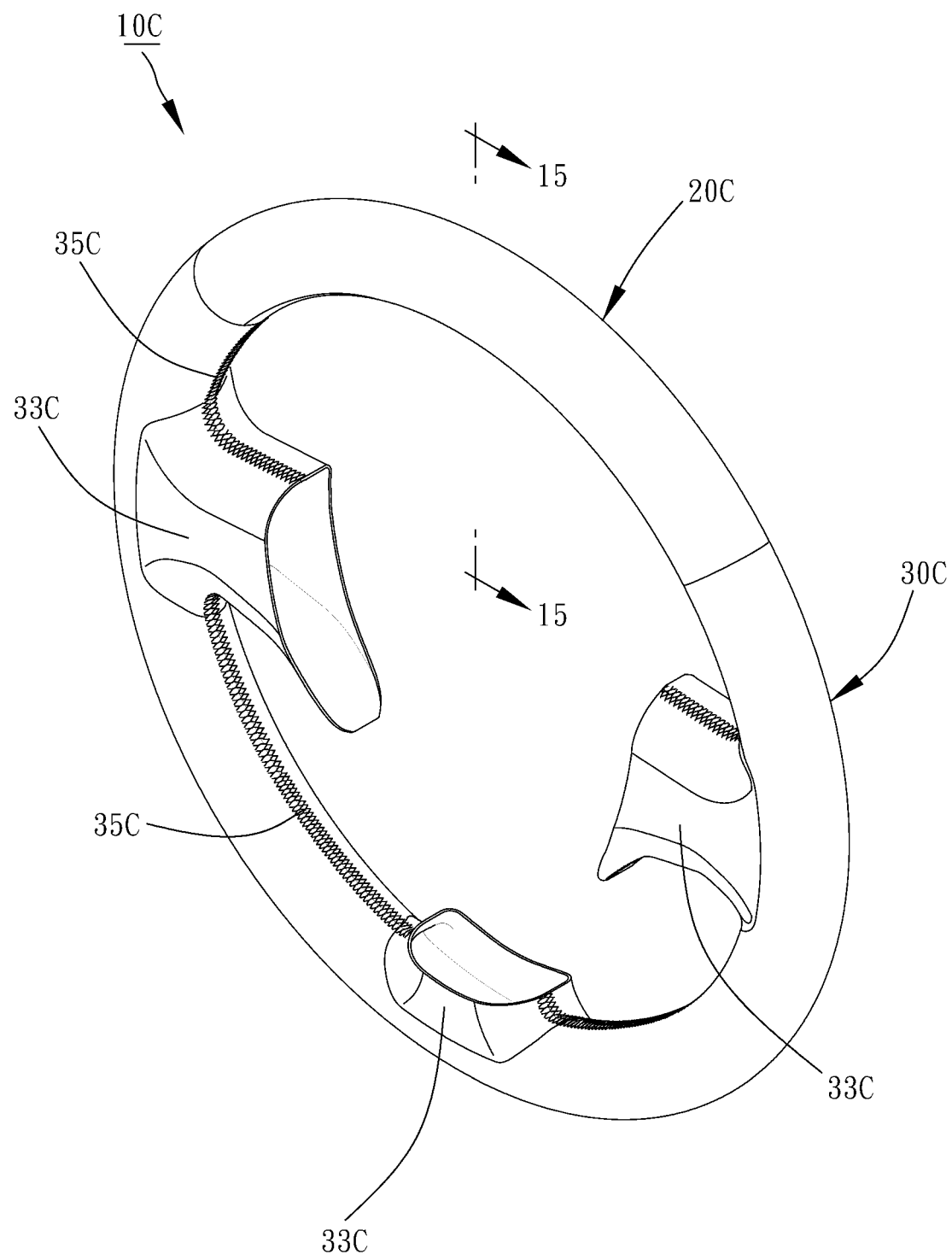
FIG. 12 is a perspective view of the fourth preferred embodiment of the present disclosure.
Figure 13:
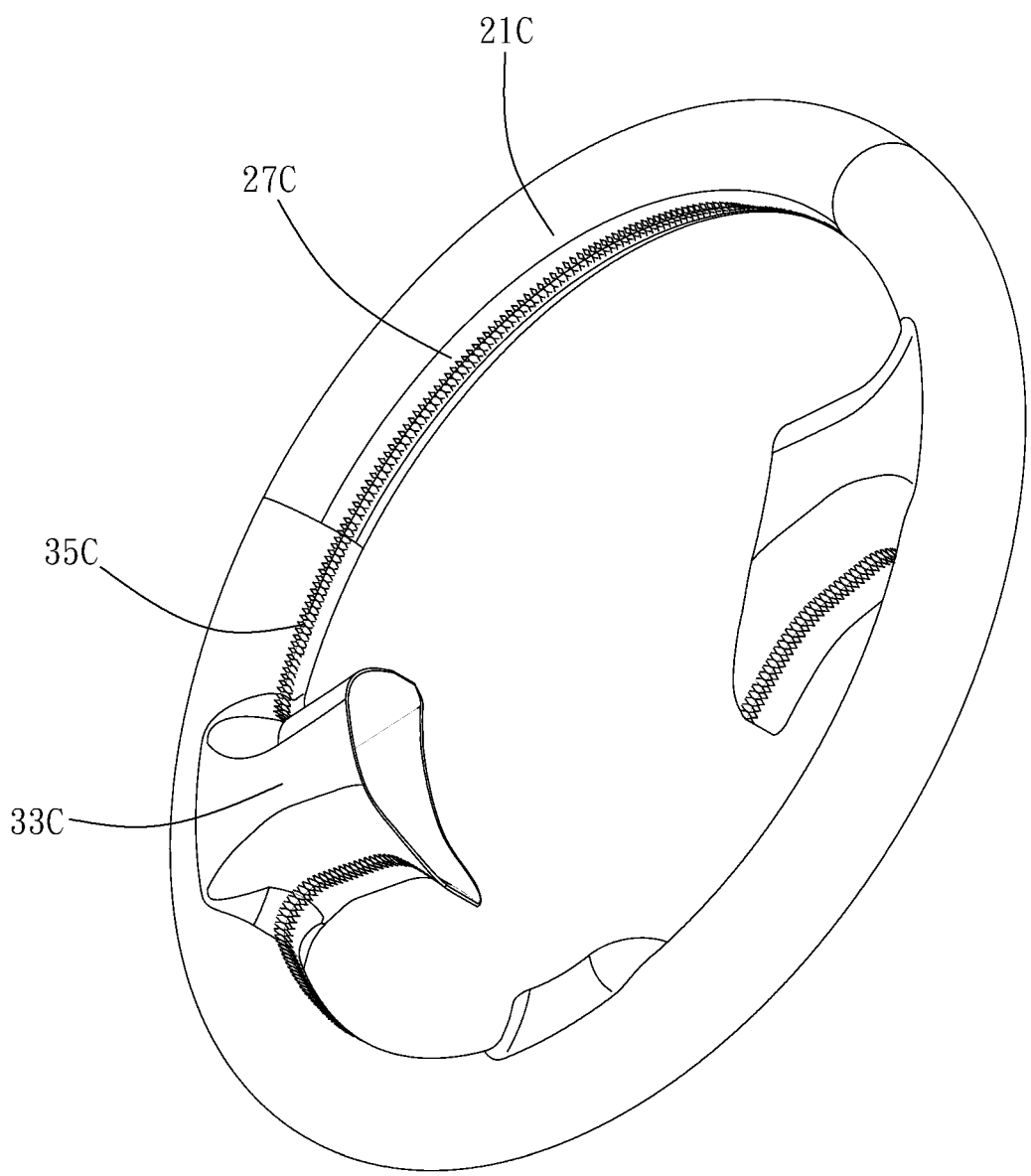
FIG. 13 is a perspective view of FIG. 12 from another angle.
Figure 14:
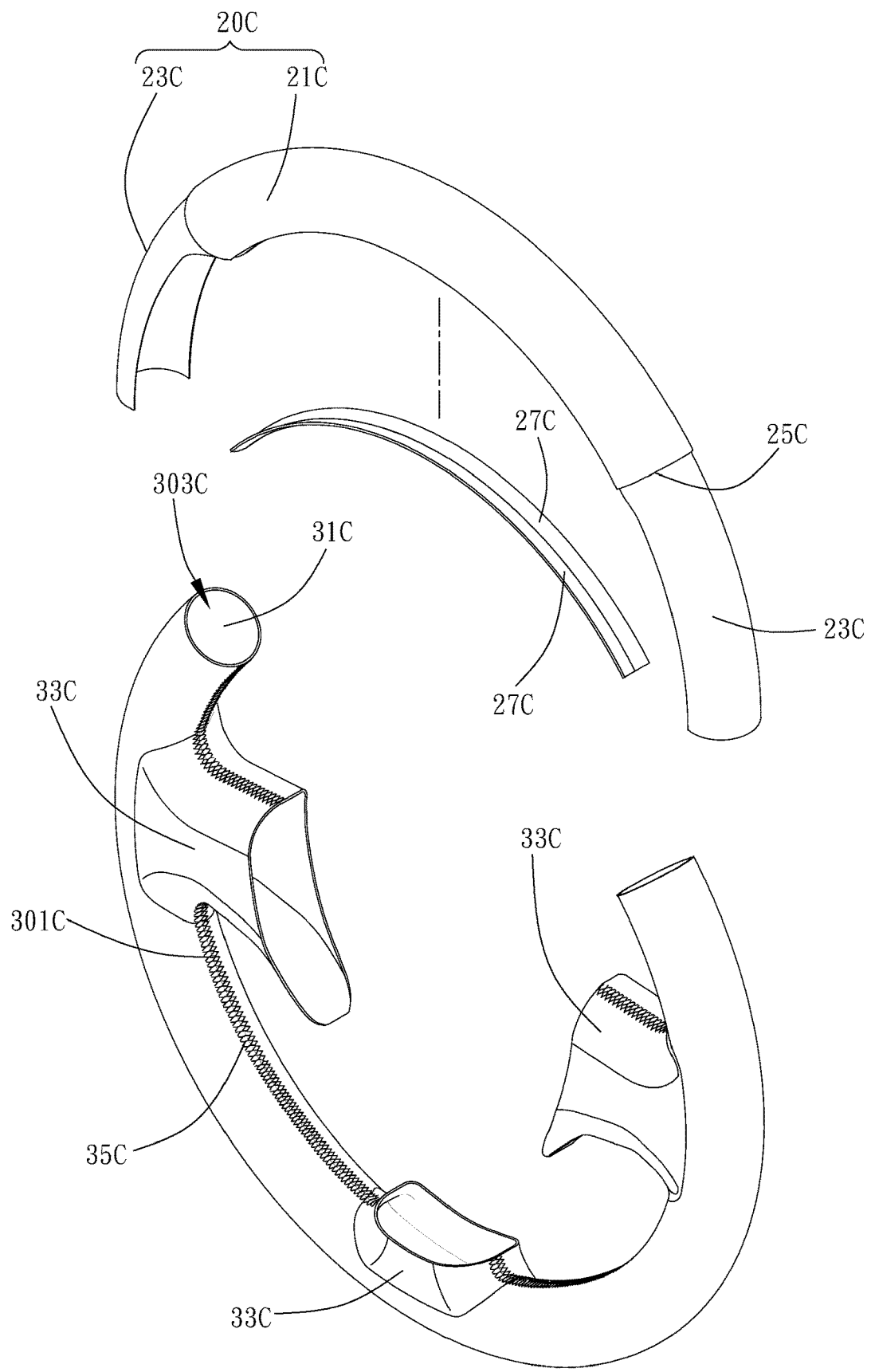
FIG. 14 is an exploded view of FIG. 12.
Figure 15:
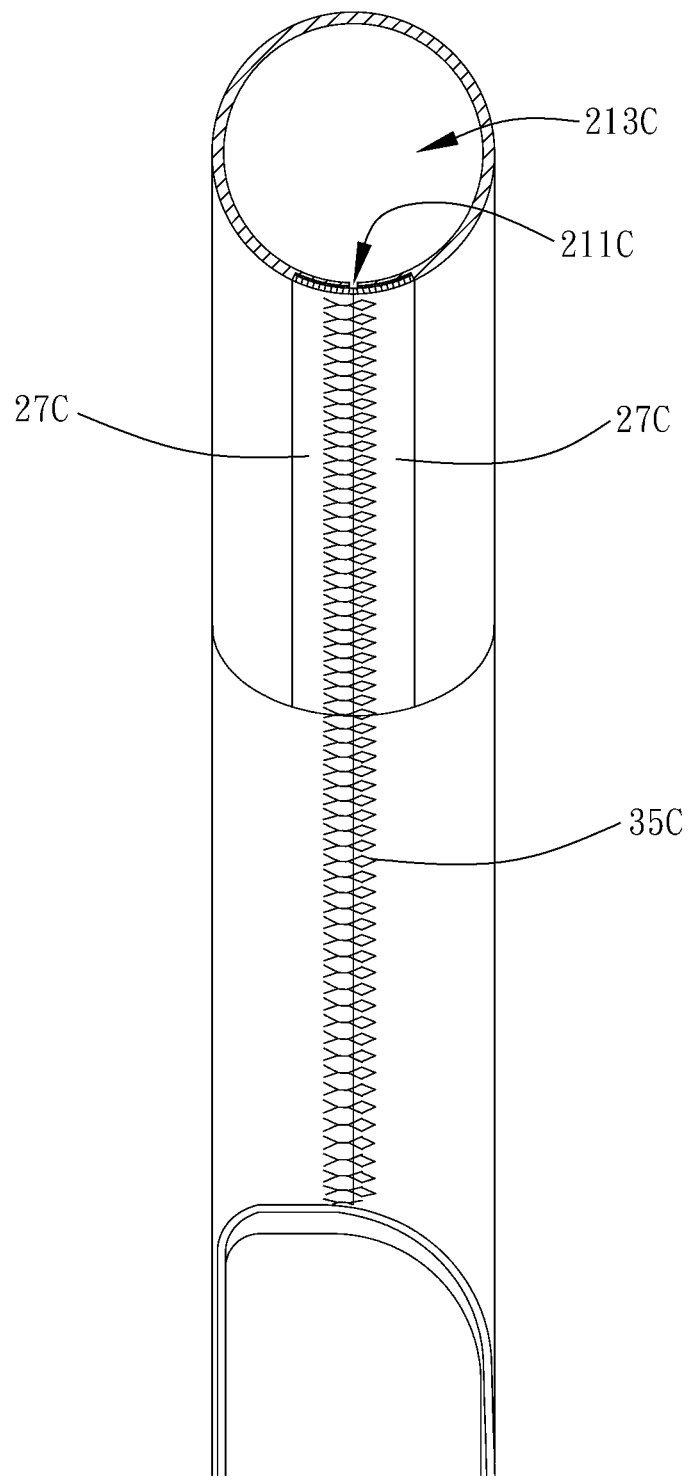
FIG. 15 is a partial cross-sectional view taken along line 15-15 of FIG. 12.
Figure 16:
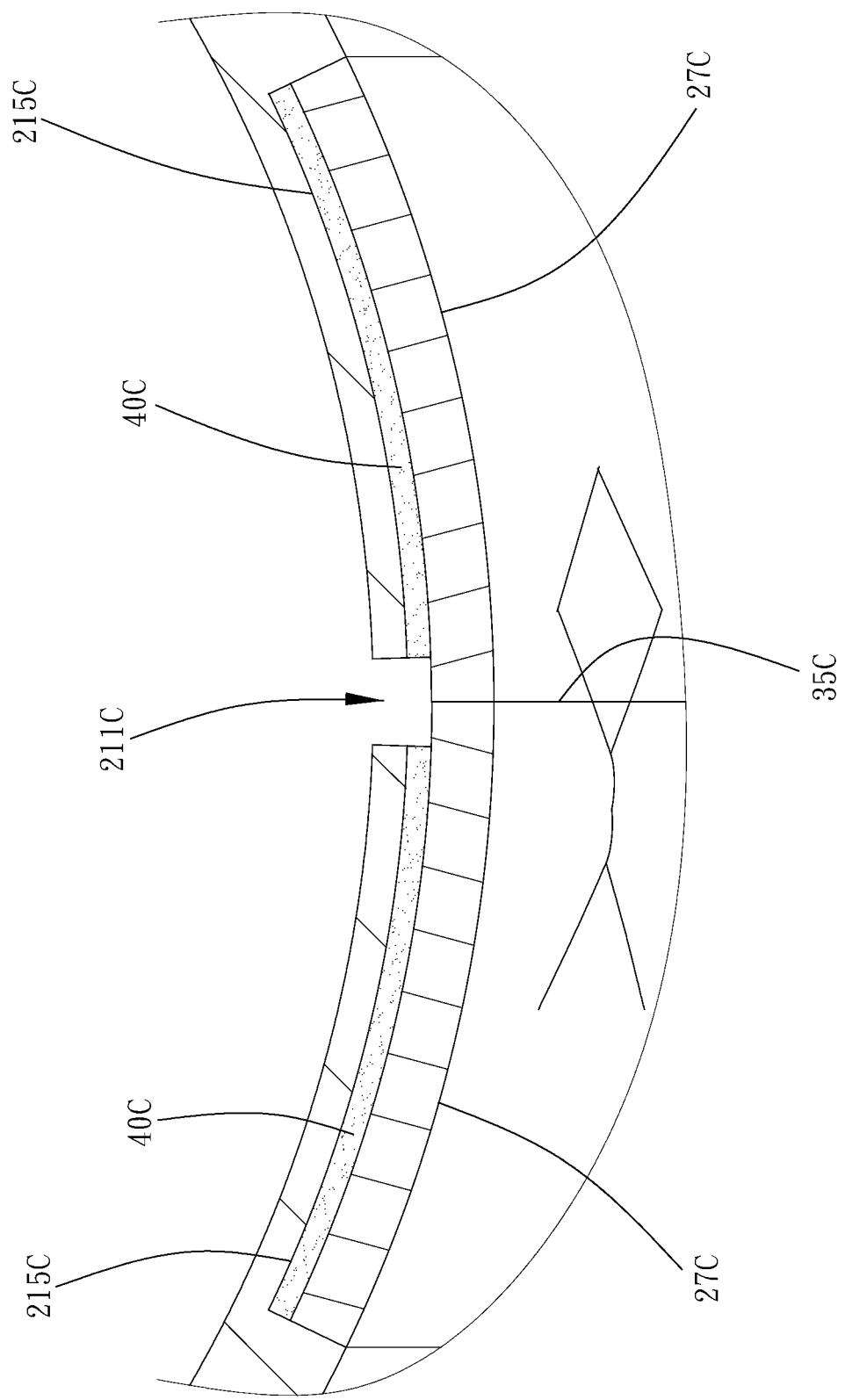
FIG. 16 is a partial view of FIG. 15.
Figure 17:
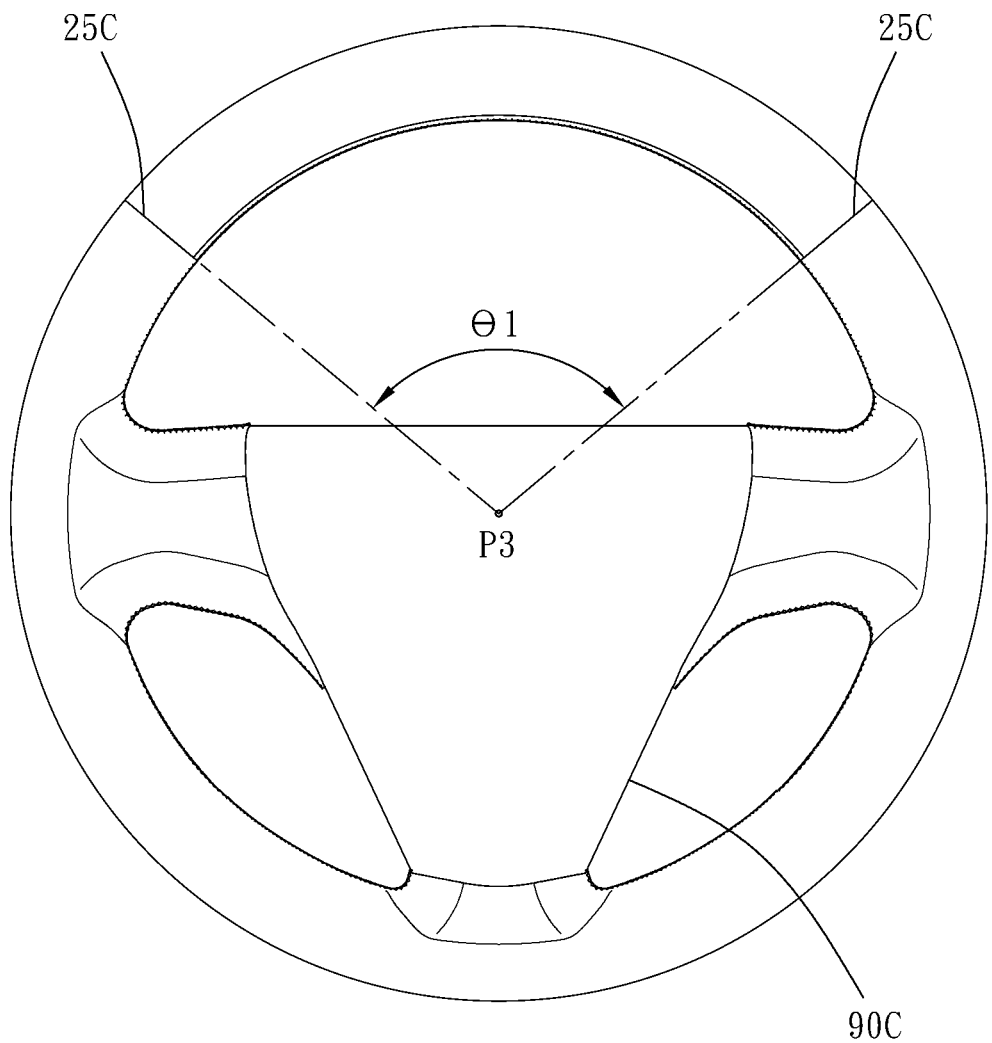
FIG. 17 is a front view of the first application of the fourth preferred embodiment of the present disclosure.

Referring to FIG. 11, the third preferred embodiment of the present disclosure discloses another steering wheel sheath 10B adapted to be mounted on a two-spoke steering wheel 90B. The steering wheel sheath 10B in the third preferred embodiment is substantially identical to its counterparts in the first and second preferred embodiments in terms of essential structures, except for the following: in the third preferred embodiment, the steering wheel sheath 10B has two carbon fiber-comprising composite elements 20B and two leather elements 30B made of leather, artificial leather or synthetic leather thereof. The two composite elements 20B are spaced apart from the two leather elements 30B. As soon as the user turns the steering wheel 90B clockwise, the two composite elements 20B of the steering wheel sheath 10B correspond in position to upper and lower segments of the steering wheel 90B, whereas the two spoke portions 33B of the two leather elements 30B are opposite and connected to the spoke portions of the steering wheel 90B, respectively.

Referring to FIGS. 12~17, the fourth preferred embodiment of the present disclosure discloses another steering wheel sheath 10C adapted to be mounted on a three-spoke steering wheel 90C. The steering wheel sheath 10C in the fourth preferred embodiment is substantially identical to its counterpart in the first, second and third preferred embodiments and thus comprises a carbon fiber-comprising composite element 20C, two cover members 27C and a leather element 30C, the two cover members 27C the leather element 30C are made of leather, artificial leather or synthetic leather thereof, except for the following. The two cover members 27C disposed on both sides of a notch 211C of the composite element 20C, respectively. The notch 211C of the composite element 20C covered with the two cover members 27C. A arcuate pipe portion 21C of the composite element 20C having two abutment segments 215C and opposed with the notch 211C of the arcuate pipe portion 21C, each abutment segment 215C caved into a body of the arcuate pipe portion 21C and covered with the two cover members 27C, respectively.

Figure 18:
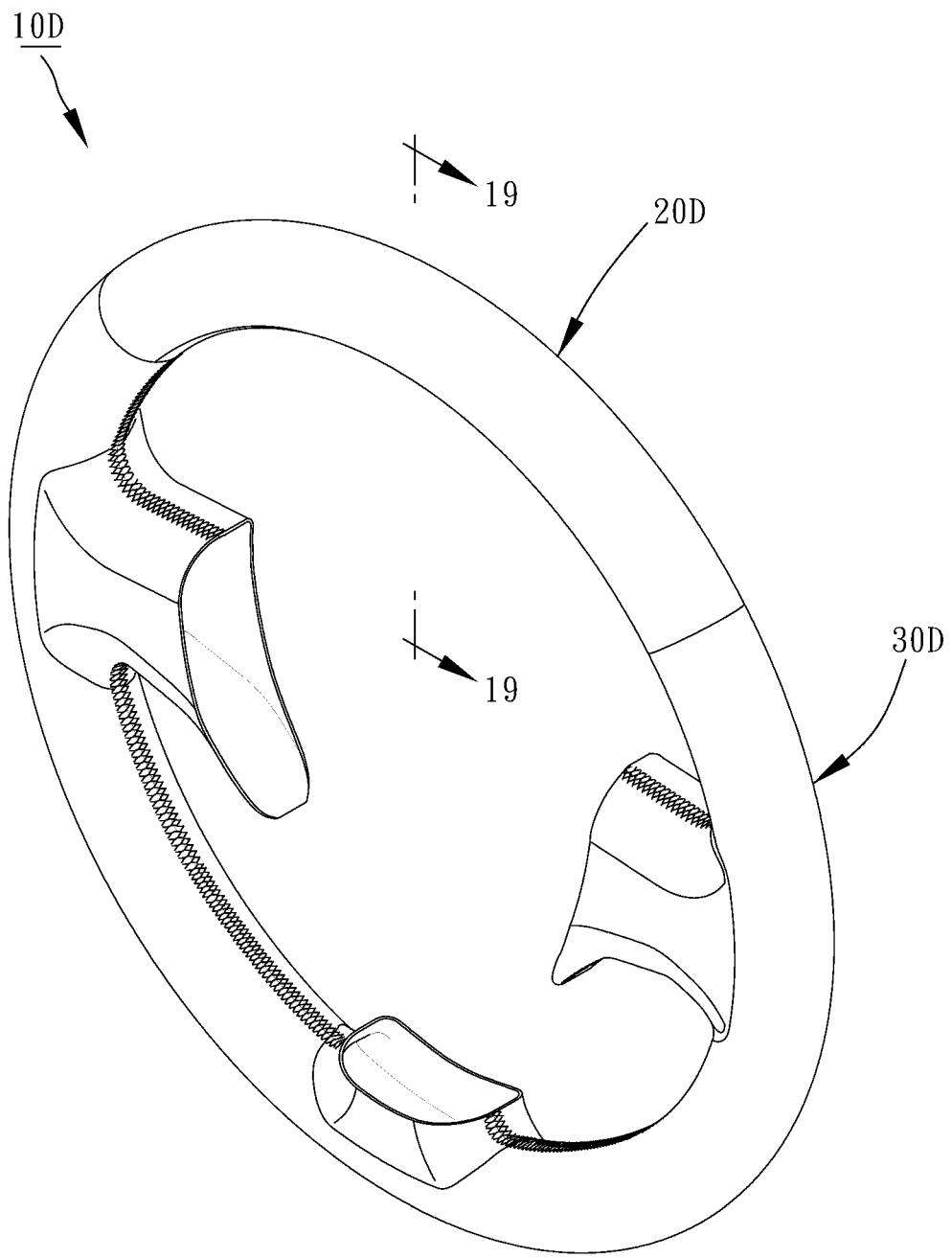
FIG. 18 is a perspective view of the fifth preferred embodiment of the present disclosure.
Figure 19:
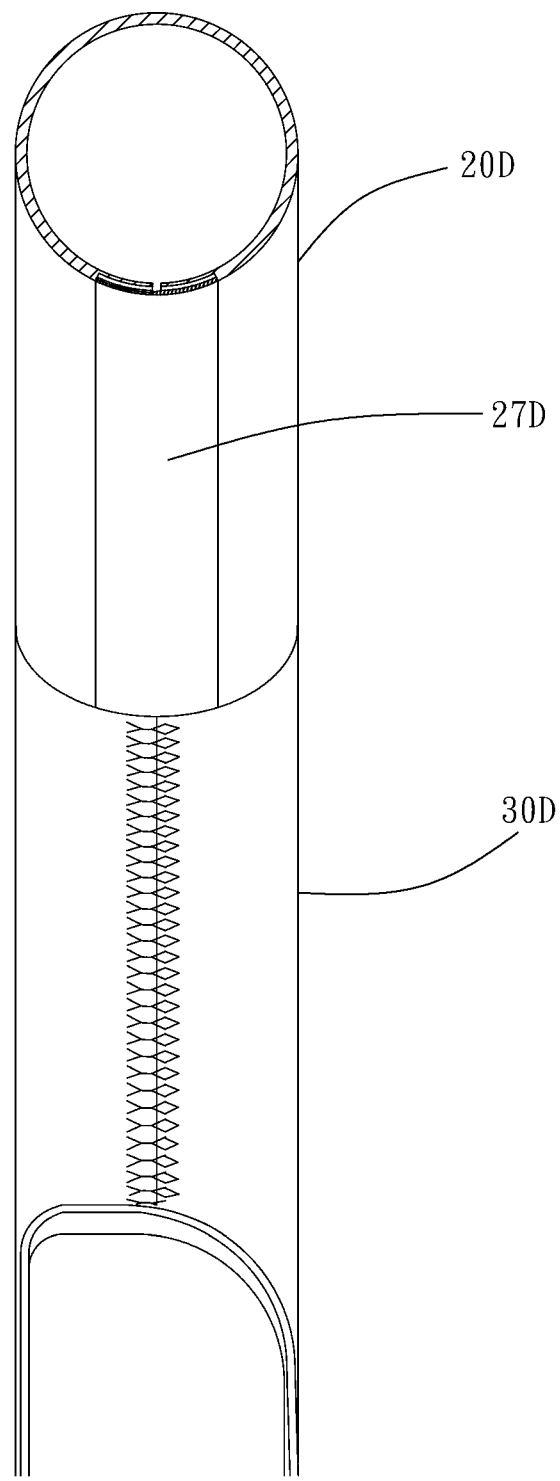
FIG. 19 is a partial cross-sectional view taken along line 19-19 of FIG. 18.
Figure 20:
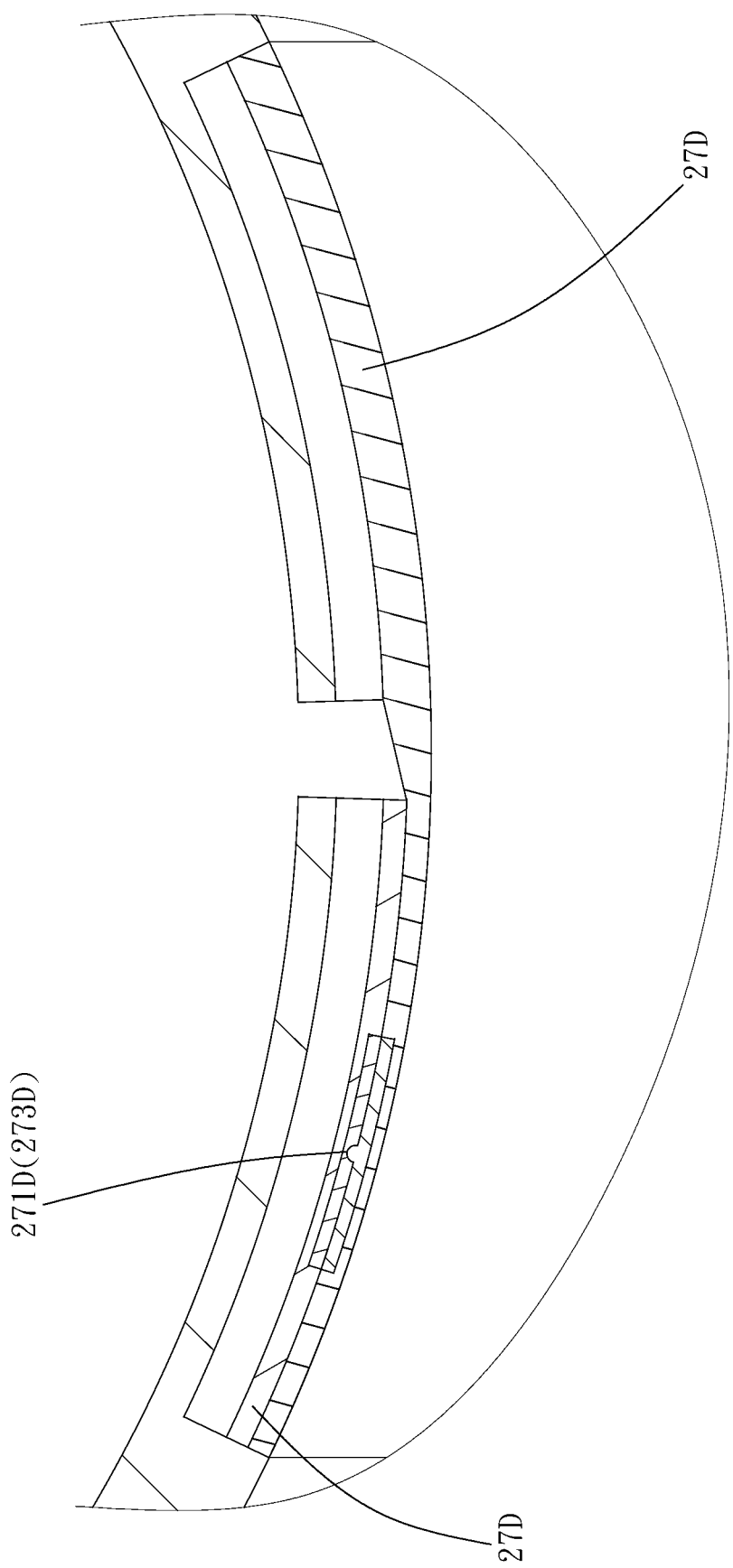
FIG. 20 is a partial view of FIG. 19.

Referring to FIGS. 18~20, the fifth preferred embodiment of the present disclosure discloses another steering wheel sheath 10D. The steering wheel sheath 10D in the fifth preferred embodiment is substantially identical to its counterpart in the fourth preferred embodiment and thus comprises a carbon fiber-comprising composite element 20D, two cover members 27D and a leather element 30D, the two cover members 27D and the leather element 30D are made of leather, artificial leather or synthetic leather thereof, except for the following. One of the cover members 27D has a main fastener 271D correspond with a secondary fastener 273D of another cover members 27D.

Figure 21:
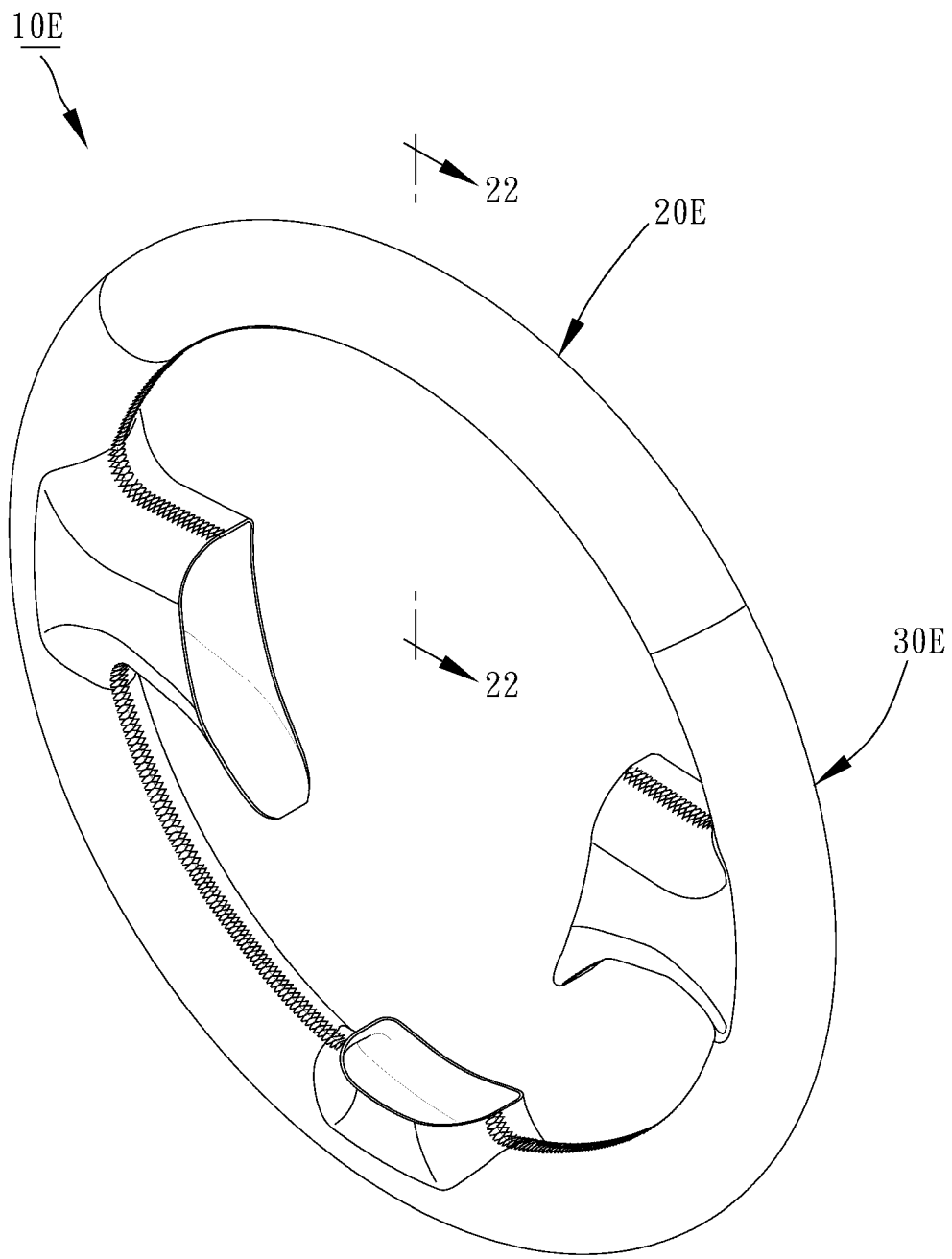
FIG. 21 is a perspective view of the sixth preferred embodiment of the present disclosure.
Figure 22:
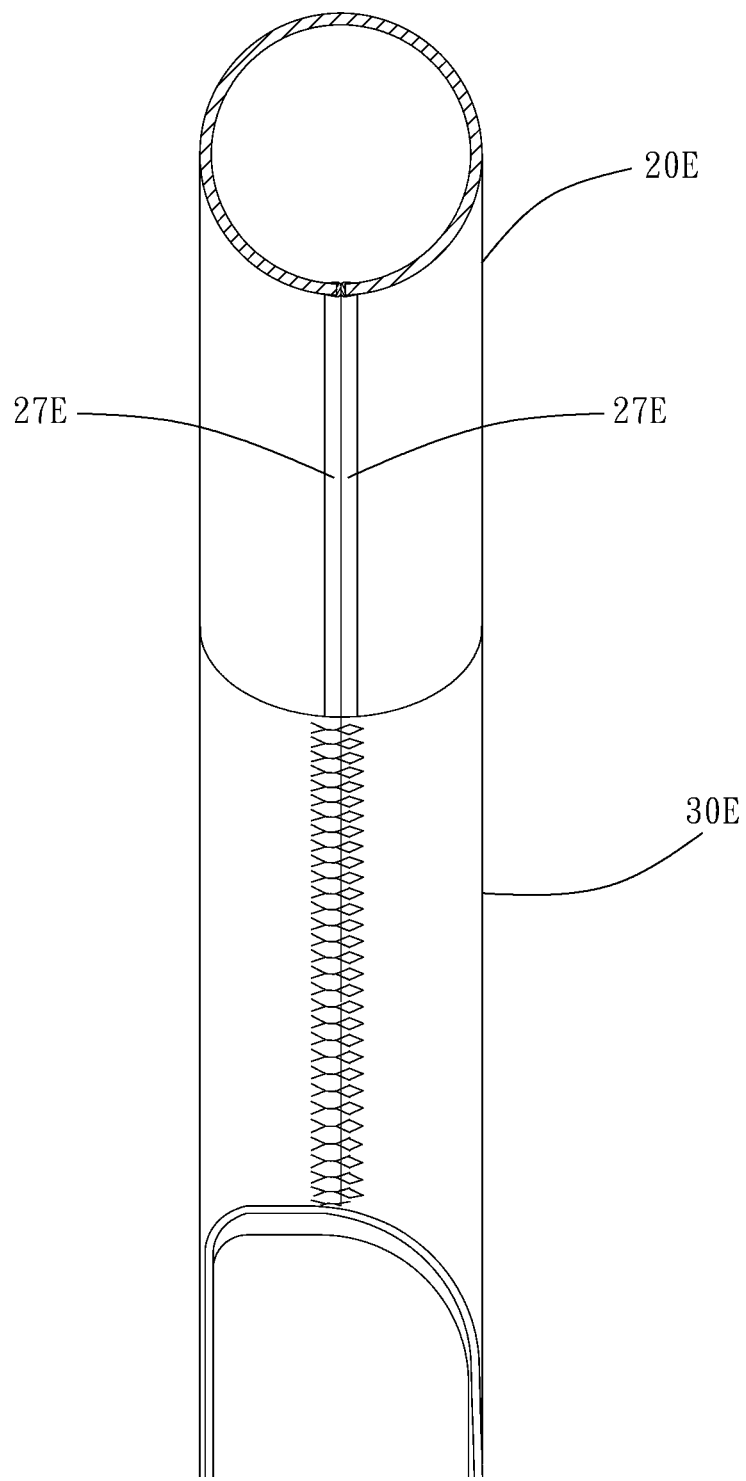
FIG. 22 is a partial cross-sectional view taken along line 22-22 of FIG. 21.
Figure 23:
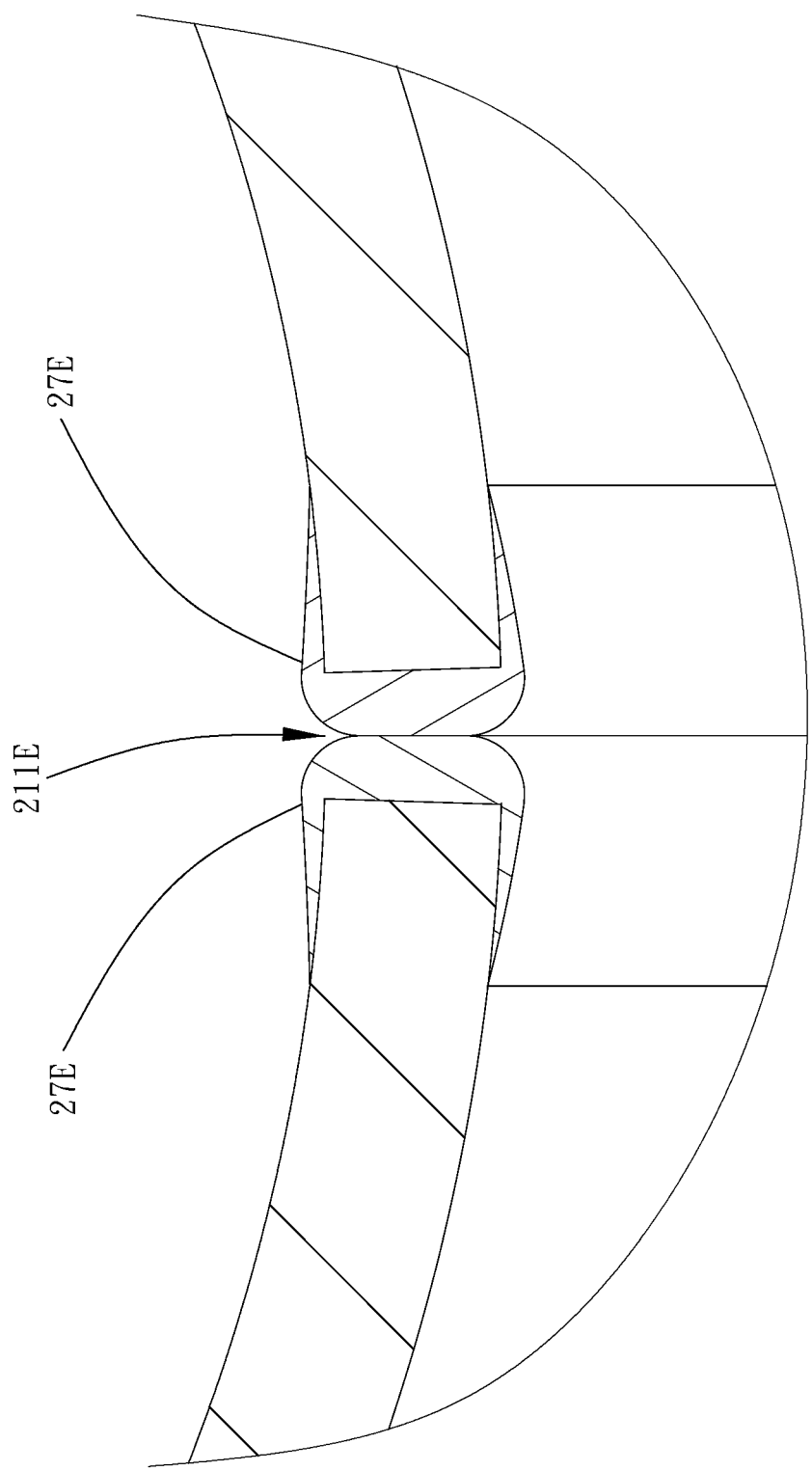
FIG. 23 is a partial view of FIG. 22.

Referring to FIGS. 21~22, the sixth preferred embodiment of the present disclosure discloses another steering wheel sheath 10E. The steering wheel sheath 10E in the sixth preferred embodiment is substantially identical to its counterpart in the fourth and fifth preferred embodiments and thus comprises a carbon fiber-comprising composite element 20E, two cover members 27E and a leather element 30E, the two cover members 27E and the leather element 30E are made of leather, artificial leather or synthetic leather thereof, except for the following. The two cover members 27E are C-shaped rubber strips, which disposed on both sides of a notch 211E of the composite element 20E, respectively, wherein the two cover members 27E are abutted.

Persons skilled in the art understand that the above detailed description and embodiments illustrative of the present disclosure are illustrative of the structures, method, process flows, and anticipated advantages thereof of the present disclosure rather than restrictive of the scope of the claims of the present disclosure. Replacements or variations of other equivalent elements, components, objects, structures, devices, methods or process flows shall also be deemed falling within the scope of the claims of the present disclosure.

What is claimed is:

1. A steering wheel sheath, comprising:
   a carbon fiber-comprising composite element comprising an arcuate pipe portion and two connection portions, the two connection portions extending to connect to two ends of the arcuate pipe portion, respectively, wherein the two ends of the arcuate pipe portion bend by a predetermined angle toward an imaginary center, and the arcuate pipe portion forms a notch and a receiving space axially, the notch being in communication with the receiving space; and
   an arcuate leather element forming a notch and a receiving space axially, the notch being in communication with the receiving space, wherein inner walls of openings at two ends of the leather element each sink to form an engaging portion, the two engaging portions corresponding in position to the two connection portions of the composite element, respectively,
   wherein an adhesive is applied to outer walls of the two connection portions of the composite element or inner walls of the two engaging portions of the leather element such that the two engaging portions of the leather element are connected to the two connection portions of the composite element, respectively, and thus coupled and fixed together.

2. The steering wheel sheath of claim 1, wherein the connection portions each have a shorter outer diameter than the arcuate pipe portion and thus form a shoulder surface such that the two engaging portions of the leather element connect to the two connection portions of the composite element and thus abut against the shoulder surfaces of the composite element, respectively.

3. The steering wheel sheath of claim 1, wherein the leather element has at least two spoke portions each extending from or sinking into a body of the leather element to take on a pouch-shape and each adhering to a spoke of a steering wheel, and the leather element is sewn to the steering wheel with a sewing thread.

4. The steering wheel sheath of claim 1, wherein a basic point is defined at a middle of a junction of each of the two connection portions of the composite element and a corresponding one of the two engaging portions of the leather element, and an included angle is formed by and between two lines connecting the imaginary center to the basic points, respectively.

5. The steering wheel sheath of claim 4, wherein the included angle ranges from 60° to 150°.

6. The steering wheel sheath of claim 2, wherein a basic point is defined at a middle of a junction of each of the two connection portions of the composite element and a corresponding one of the two engaging portions of the leather element, and an included angle is formed by and between two lines connecting the imaginary center to the basic points, respectively.

7. The steering wheel sheath of claim 6, wherein the included angle ranges from 60° to 150°.

8. The steering wheel sheath of claim 3, wherein a basic point is defined at a middle of a junction of each of the two connection portions of the composite element and a corresponding one of the two engaging portions of the leather element, and an included angle is formed by and between two lines connecting the imaginary center to the basic points, respectively.

9. The steering wheel sheath of claim 8, wherein the included angle ranges from 60° to 150°.

10. A steering wheel sheath, comprising:
    two carbon fiber-comprising composite elements each comprising an arcuate pipe portion and two connection portions, the two connection portions extending to connect to two ends of the arcuate pipe portion, respectively, wherein the two ends of the arcuate pipe portion of each said composite element bend by a predetermined angle toward an imaginary center, and the arcuate pipe portion forms a notch and a receiving space axially, the notch being in communication with the receiving space; and
    two arcuate leather elements each forming a notch and a receiving space axially, the notch being in communication with the receiving space, wherein inner walls of openings at two ends of each said leather element each sink to form an engaging portion, the two engaging portions corresponding in position to the two connection portions of the composite element, respectively,
    wherein the two composite elements are spaced apart from the two leather elements, an adhesive is applied to outer walls of the two connection portions of each said composite element or inner walls of the two engaging portions of each said leather element such that the two engaging portions of each said leather element are connected to the two connection portions of each said composite element, respectively, and thus coupled and fixed together.

11. The steering wheel sheath of claim 10, wherein the connection portions each have a shorter outer diameter than the arcuate pipe portion and thus form a shoulder surface such that the two engaging portions of each said leather element connect to the two connection portions of each said composite element and thus abut against the shoulder surfaces of the composite element, respectively.

12. The steering wheel sheath of claim 10, wherein each said leather element has at least two spoke portions each extending from or sinking into a body of the leather element to take on a pouch-shape and each adhering to a spoke of a steering wheel, and the leather element is sewn to the steering wheel with a sewing thread.

13. The steering wheel sheath of claim 1, further comprising two cover members, which disposed on both sides of the notch of the composite element, respectively, wherein, the two side of the notch covered with the two cover members.

14. The steering wheel sheath of claim 13, wherein the arcuate pipe portion having two abutment segments and opposed with the notch of the arcuate pipe portion, wherein each abutment segment caved into a body of the arcuate pipe portion and covered with the two cover members, respectively.

15. The steering wheel sheath of claim 13, wherein the two cover members are C-shaped rubber strips, which disposed on both sides of the notch of the composite element, respectively, wherein the two cover members are abutted.

16. The steering wheel sheath of claim 13, wherein the connection portions each have a shorter outer diameter than the arcuate pipe portion and thus form a shoulder surface such that the two engaging portions of the leather element connect to the two connection portions of the composite element and thus abut against the shoulder surfaces of the composite element, respectively.

17. The steering wheel sheath of claim 13, wherein the leather element has at least two spoke portions each extending from or sinking into a body of the leather element to take on a pouch-shape and each adhering to a spoke of a steering wheel, and the leather element is sewn to the steering wheel with a sewing thread.

18. The steering wheel sheath of claim 14, wherein the leather element has at least two spoke portions each extending from or sinking into a body of the leather element to take on a pouch-shape and each adhering to a spoke of a steering wheel, and the leather element is sewn to the steering wheel with a sewing thread.

* * * * *